United States Patent
Simon

(10) Patent No.: US 9,267,249 B2
(45) Date of Patent: Feb. 23, 2016

(54) WORK TRAIN WITH A MILLING DEVICE AND A TRANSPORT DEVICE WITH A SENSOR DEVICE FOR DISTANCE MONITORING, MILLING DEVICE WITH A SENSOR DEVICE AND METHOD FOR DISTANCE MONITORING WITH A WORK TRAIN

(71) Applicant: BOMAG GmbH, Boppard (DE)

(72) Inventor: Martin Simon, Brodenbach (DE)

(73) Assignee: BOMAG GmbH, Boppard (DE)

( * ) Notice: Subject to any disclaimer, the term of this patent is extended or adjusted under 35 U.S.C. 154(b) by 0 days.

(21) Appl. No.: 13/624,552

(22) Filed: Sep. 21, 2012

(65) Prior Publication Data

US 2013/0076101 A1    Mar. 28, 2013

(30) Foreign Application Priority Data

Sep. 22, 2011   (DE) .......................... 10 2011 114 185

(51) Int. Cl.
| | | |
|---|---|---|
| *E01C 23/088* | (2006.01) | |
| *E01C 23/12* | (2006.01) | |
| *G05D 1/02* | (2006.01) | |
| *E01C 19/00* | (2006.01) | |

(Continued)

(52) U.S. Cl.
CPC ............. *E01C 23/088* (2013.01); *E01C 23/127* (2013.01); *G05D 1/0293* (2013.01); *E01C 19/004* (2013.01); *E21C 41/26* (2013.01); *E21C 47/00* (2013.01); *G05D 2201/0202* (2013.01)

(58) Field of Classification Search
CPC ... E01C 19/002; E01C 19/004; E01C 19/006; E01C 2301/02; E01C 2301/04

USPC ................... 299/1.5, 1.9, 39.2, 39.4
See application file for complete search history.

(56) References Cited

U.S. PATENT DOCUMENTS

| | | | | |
|---|---|---|---|---|
| 4,818,139 A | * | 4/1989 | Brock et al. ................... | 404/81 |
| 5,575,316 A | | 11/1996 | Pollklas | |

(Continued)

FOREIGN PATENT DOCUMENTS

| | | |
|---|---|---|
| DE | 44 03 893 A1 | 8/1995 |
| DE | 196 54 626 A1 | 7/1998 |

(Continued)

OTHER PUBLICATIONS

Espacenet.com, English Machine Translation of European Patent No. EP0667415A1, published Aug. 16, 1995, retrieved from http://worldwide.espacenet.com on Feb. 18, 2013 (6 pages).

(Continued)

*Primary Examiner* — David Bagnell
*Assistant Examiner* — Michael Goodwin
(74) *Attorney, Agent, or Firm* — Wood, Herron & Evans, LLP

(57) ABSTRACT

The present invention relates to a work train, a device and a method for distance measurement between a transport device and a milling device. During the loading of a transport device with milled material from the milling device, the operator of the milling device normally transmits control commands to the transport device driver for coordination of the loading process. Through the automated distance measuring between the transport device and the milling device and control of a display device according to the present invention, this task is taken over from the operator of the milling device, who can concentrate on the actual milling process.

16 Claims, 6 Drawing Sheets

(51) Int. Cl.
*E21C 41/26* (2006.01)
*E21C 47/00* (2006.01)

(56) References Cited

U.S. PATENT DOCUMENTS

| | | | |
|---|---|---|---|
| 5,667,279 | A | 9/1997 | Christopher et al. |
| 5,921,708 | A * | 7/1999 | Grundl et al. ................ 404/84.1 |
| 6,682,416 | B2 | 1/2004 | Behnke et al. |
| 2009/0222186 | A1 | 9/2009 | Jensen |
| 2010/0215433 | A1 | 8/2010 | Fritz |
| 2010/0283598 | A1* | 11/2010 | King et al. .................... 340/472 |
| 2010/0296867 | A1* | 11/2010 | Buschmann et al. ......... 404/108 |
| 2011/0022273 | A1 | 1/2011 | Peters et al. |
| 2011/0080034 | A1* | 4/2011 | Schonebeck et al. .......... 299/1.5 |
| 2011/0123268 | A1* | 5/2011 | Berning et al. ................ 404/90 |

FOREIGN PATENT DOCUMENTS

| | | | |
|---|---|---|---|
| DE | 10 2004 011 789 | A1 | 9/2005 |
| DE | 102005035480 | A1 | 2/2007 |
| DE | 102005044485 | A1 | 4/2007 |
| DE | 10 2008 015 277 | A1 | 9/2009 |
| EP | 0 667 415 | A1 | 8/1995 |
| EP | 1 219 153 | A2 | 7/2002 |
| EP | 1 574 122 | A1 | 9/2005 |
| EP | 2 006 448 | A1 | 12/2008 |
| JP | 1150415 | A | 2/1999 |
| WO | 2005123440 | A1 | 12/2005 |

OTHER PUBLICATIONS

Espacenet.com, English Machine Translation of German Patent No. DE19654626A1, published Jul. 9, 1998, retrieved from http://worldwide.espacenet.com on Feb. 18, 2013 (22 pages).
Espacenet.com, English Machine Translation of European Patent No. EP1219153A2, published Jul. 3, 2002, retrieved from http://worldwide.espacenet.com on Feb. 18, 2013 (48 pages).
Espacenet.com, English Machine Translation of European Patent No. EP1574122A1, published Sep. 14, 2005, retrieved from http://worldwide.espacenet.com on Feb. 18, 2013 (14 pages).
Espacenet.com, English Machine Translation of European Patent No. EP2006448A1, published Dec. 24, 2008, retrieved from http://worldwide.espacenet.com on Feb. 18, 2013 (19 pages).
Espacenet.com, English Machine Translation of German Patent No. DE102008015277A1, published Sep. 24, 2009, retrieved from http://worldwide.espacenet.com on Feb. 18, 2013 (15 pages).
Espacenet.com, English Machine Translation of German Patent No. DE4403893A1, published Aug. 10, 1995, retrieved from http://worldwide.espacenet.com on Sep. 24, 2012 (13 pages).
Espacenet.com, English Machine Translation of German Patent No. DE102004011789A1, published Sep. 29, 2005, retrieved from http://worldwide.espacenet.com on Sep. 24, 2012 (11 pages).
Espacenet.com, English Machine Translation of German Patent No. DE102005035480A1, published Feb. 1, 2007, retrieved from http://worldwide.espacenet.com on Sep. 24, 2012 (9 pages).
German Patent Office, Search Report, Application No. 10 2011 114 185.9, dated Jun. 27, 2012 (4 pages).
Espacenet, English Machine Translation, Japanese Patent No. JPH1150415A, published Feb. 23, 1999, retrieved from http://worldwide.espacenet.com on Nov. 6, 2015 (11 pages).
Espacenet, English Machine Translation, International Publication No. WO2005123440A1, published Dec. 29, 2005, retrieved from http://worldwide.espacenet.com on Nov. 6, 2015 (10 pages).
Espacenet, English Machine Translation, German Patent No. DE102005044485A1, published Apr. 5, 2007, retrieved from http://worldwide.espacenet.com on Nov. 6, 2015 (10 pages).

* cited by examiner

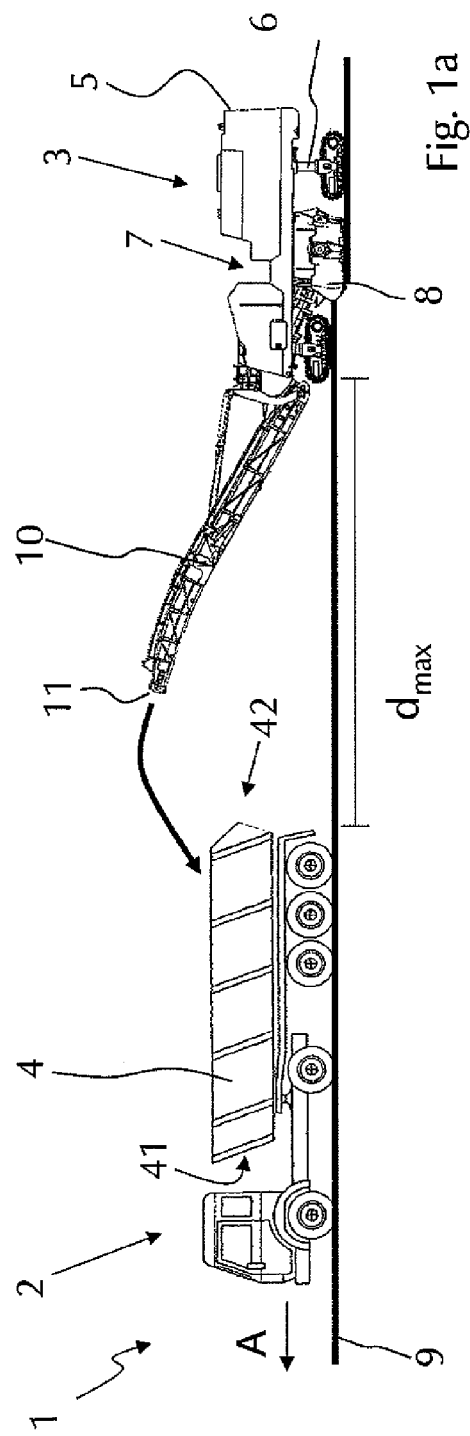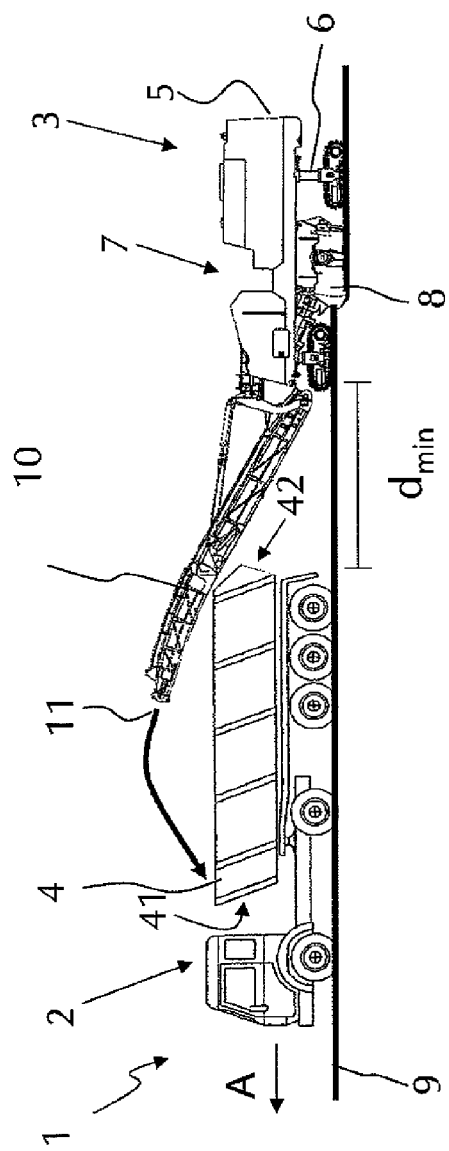

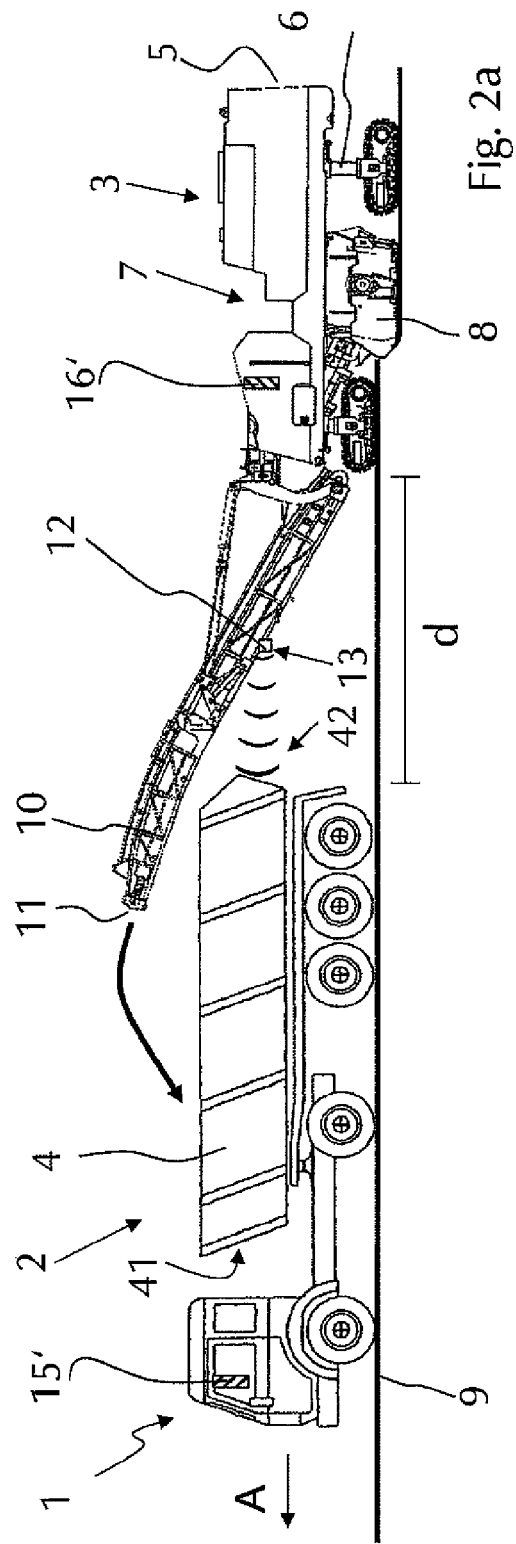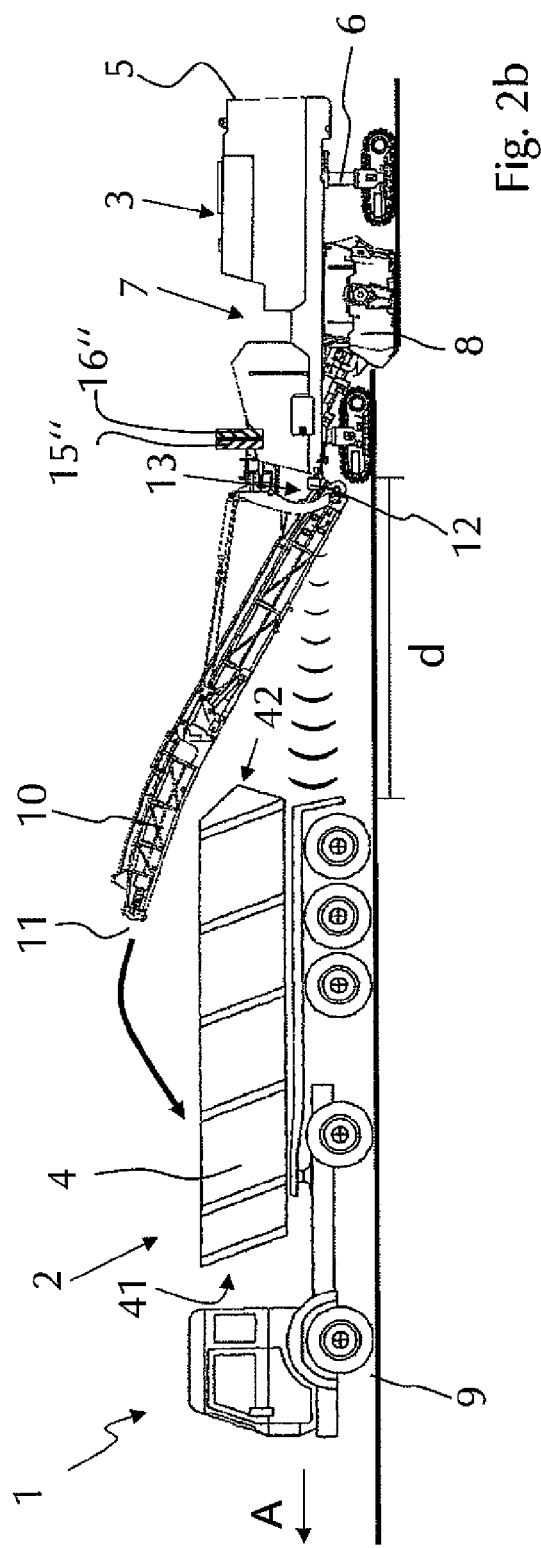

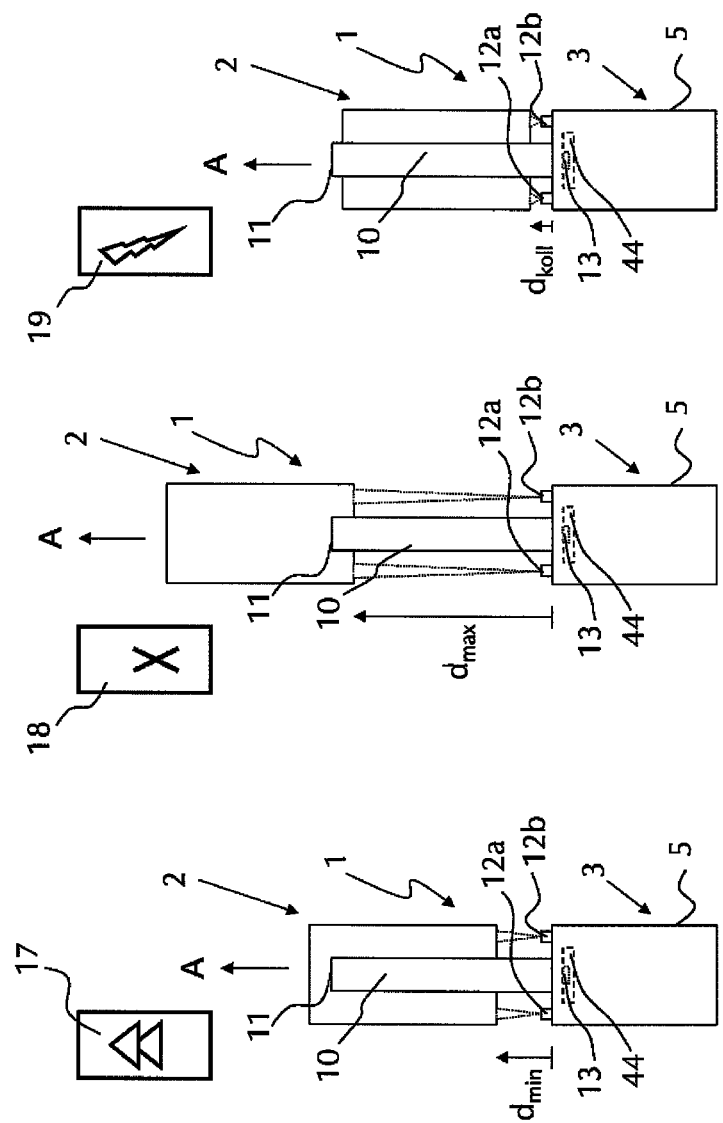

WORK TRAIN WITH A MILLING DEVICE AND A TRANSPORT DEVICE WITH A SENSOR DEVICE FOR DISTANCE MONITORING, MILLING DEVICE WITH A SENSOR DEVICE AND METHOD FOR DISTANCE MONITORING WITH A WORK TRAIN

CROSS-REFERENCE TO RELATED APPLICATIONS

The present application claims priority under 35 U.S.C. §119 of German Patent Application No. 10 2011 114 185.9, filed Sep. 22, 2011, the disclosure of which is hereby incorporated herein by reference in its entirety.

FIELD OF THE INVENTION

The present invention relates to a work train, including a milling device and a transport device, with a device for monitoring the distance between the transport device and the milling device, a milling device with such a monitoring device and a method for distance monitoring with such a work train.

BACKGROUND OF THE INVENTION

Generic milling devices are known from the prior art and are used, for example, in road construction, especially as cold milling machines, stabilisers and/or recyclers, or for the removal of soil material, for example in open cast mining operation as surface miners. Such a milling device features a work roller, the outer surface of which is equipped with a multitude of milling tools, especially chisels. Depending on the application and the normal operation, the work roller can be operated in or against the working direction of the milling device. During the milling operation, the work roller rotates about its axis of rotation and the cutting tools submerging into the ground remove soil to a predetermined milling depth. Such milling equipment is designed either as an attachment parts or, preferably, as self-propelled machines. In order to guarantee an effective and continuous work process, the soil milled off by the work roller is normally transported to a drop point during the milling operation with the help of a conveyor device. From the drop point, the milled material is discharged into a transport container of a transport device, such as a lorry or dump truck. In this process, various arrangements of the milling device and the transport device with respect to the conveyor device are possible. If the milling device is designed as a so-called rear loader, the milled material is discharged from the milling device backward into the transport device. If the conveyor is a side loader, the milled material is transported to the side, and in case of a front loader, the milled material is transferred forward, or in the working direction of the milling device, into the transport device. As soon as the transport container of a transport device is loaded to its maximum fill height, the transport device is removed from the work train and replaced with a transport device with an empty transport container.

During milling operation, the milling device moves in the work direction over the ground to be processed. To achieve a simultaneous milling and discharging of the milled material, the transport device and the milling device must always move in the working or travelling direction at such a distance to one another that the milled material can be transported by the conveyor device into the corresponding transport container of the transport device. Because the transport device normally cannot move forward as slowly as the milling device does and thus the drop point of the conveyor device shifts relative to the transport container in the working direction, the challenge lies in continually monitoring the distance between the transport device and the milling device, adjusting it accordingly and keeping it in a range in which the milled material can still be discharged into the transport container of the transport device reliably and as completely as possible, so as to avoid for example milled material falling off beside the transport container, which poses a considerable accident risk to nearby persons. A common practice is the repeated driving forward and stopping of the transport device relative to the nearly continually moving milling device. Evenly loading over the entire surface of the transport container of the transport device poses a further challenge. This method is explained in greater detail below with a front-loader street milling machine.

If the transport device drives ahead of the milling device, it is difficult for the driver of the transport device to observe the discharging process of the milled material taking place behind his back. Therefore, the following tasks fall upon the driver of the milling device: First, it must be ensured that the milling device mills ground in the desired area and that the milled-off material reaches the transport container of the transport device via the conveyor device as completely as possible. Furthermore, the transport container should be loaded evenly. Moreover, the driver must avoid a collision between the milling device and the transport device driving ahead or following behind. In present practice, coordinating these tasks is solely the responsibility of the operator of the milling device. In addition, he must scan the surroundings for potential dangers, obstacles or curves. All this adds up to place especially high demands on the attentiveness of the operator of the milling device and can quickly lead to errors in the milling and loading operation.

At present, the coordination of the distance between the milling device and the transport device usually occurs in practice via horn signals that are triggered by the operator of the milling device manually and at his own discretion. If the transport device has driven too far forward in the working direction, the milled material no longer reaches the transport container but falls to the ground between the transport device and the milling device. To prompt the driver of the transport device to stop and thus bring the transport container back into the range of the conveyor device, the milling device driver triggers the horn. When the milling device, moving forward with nearly constant speed, has drawn closer to the stopped transport device up to a minimum distance, the milling device driver triggers the horn again to alert the transport device driver to start driving again in order to avoid a collision between the two vehicles. The minimum distance is the distance at which the conveyor device can just still discharge the milled material into the front part of the transport container and at which the milling device does just not yet immediately collide with the transport device. Thereupon, the transport device driver drives forward until the maximum distance between the two vehicles is reached. The maximum distance for the loading process is the distance between both vehicles of the work train in which the milled material is just still discharged into the transport container and does just not yet fall behind the transport container onto the ground. When the maximum distance is reached, the milling device driver again uses a horn signal to instruct the transport device driver to stop the transport device. Relative to one another, the milling device and the transport device therefore oscillate during the loading process between the maximum and minimum distances to one another while moving forward as a whole in the working direction. If the transport container is full, the operator of the milling device gives another corresponding horn signal for departing.

Considering the multitude of tasks that fall upon the operator of the milling device, this activity places especially high demands on his concentration and attentiveness. Moreover, the horn signals can confuse other traffic participants, who might misunderstand the horn signals of the milling device as warning of a danger. At the same time, the driver of the transport device can also be confused and unsettled by the horn signals by other traffic participants. Furthermore, people who live in the area near construction sites, especially in the case of night construction work, can be disturbed by the repeated horn signals.

SUMMARY OF THE INVENTION

The object of the present invention is therefore to provide a device and a method which relieves the driver of the milling device of pressure during the milling operation. Ideally, at the same time, a disruption of other traffic participants and residents should be minimized as much as possible, and moreover a collision between the milling device and the transport device during the loading process should be prevented.

A central aspect of the present invention, according to one embodiment, lies in the fact that the operator of the milling device is relieved by an automatic distance monitoring that monitors the distance, especially horizontally and very particularly in the working direction, between the transport device and the milling device. The distance monitoring can be designed in such a way that it displays the actual measured distance and then the operator of the milling device, depending on the displayed distance value, transmits commands to the driver of the transport device. Preferably, however, the distance monitoring also coordinates the issuing of corresponding control commands, as is described in greater detail below. Thus the operator of the milling device can concentrate particularly on carrying out the milling work during milling operation and is not distracted by parallel monitoring of the distance between the milling device and the transport device. The operator of the milling device therefore no longer needs to continually estimate the distance and transmit commands to the transport device driver to control the discharging process. Consequently, collisions between the milling device and the transport device no longer occur, even in the case of lack of attention on the part of the milling device driver. Depending on the embodiment of the present invention, moreover, it is also possible at the same time to relieve the transport device driver of stress in that he no longer constantly needs to be prepared to hear the horn signal of the milling device or to distinguish it from other noise and horn signals and to react accordingly. These advantages of the present invention show especially clearly when the loading process during the milling process occurs in constricted spaces, as is frequently the case especially, e.g., in street construction, so that overall an increased safety for persons and traffic in the work area of the milling device is achieved. All told, the present invention further impresses through its simple and therefore especially efficient design, which allows for a reliable and collision-free loading transfer of the milled material into a transport vehicle by a mere distance monitoring that occurs especially in the horizontal direction.

The implementation of the present invention occurs in practice with the help of a sensor device, a control unit and a display device. The sensor device is designed to determine and monitor the distance, especially horizontally, between the milling device and the transport device, optimally in or against the working direction of the milling device during operation. The sensor device is generally designed to determine the distance between itself and the other vehicle in the work train (or an obstacle) in a given direction, especially the distance going from the milling device to the transport device, particularly in or against the work direction. Optimally, in this process, the distance between the milling device and the transport device in the horizontal plane in or against the working direction is determined. Suitable sensors for distance measurement are commonly known by the person skilled in the art. The distance measurement occurs, for example, particularly on the basis of defined measurement parameters, such as travel-time measurement of electromagnetic or acoustic waves or by means of electro-optical measurement.

The measurement values or distance values between milling device and transport device determined by the sensor device are transmitted to a control unit. The control unit is designed such that it controls one or more output devices depending on the constantly measured distance. The output device is thus that element through which the distance information, whether as a specific distance value or, preferably, as a distance-dependent control command, which has been measured by the sensor device and calculated by the control unit, is given in a way perceptible from the outside. The output device can thus in particular be that element through which the driver of the transport device receives his commands to drive, stop and depart independent from an active operation on the part of the operator of the milling device. The output device in this embodiment is characterized by the fact that it is designed to give control orders in such a way that the driver of the transport device can perceive and implement them. Overall, the combination of the sensor device, control unit and output device thus takes over the coordination of the distance between the milling device and the transport device and relieves the operator of the milling device of this task.

It is self-evident that the practical implementation of the present invention can have recourse to a broad spectrum of alternative options, especially with regard to the design of the sensor device, the control unit, and the display device. Below, examples of preferred further developments of the present invention are described in greater detail.

The term "sensor device" in the context of this application designates that device which is used for the actual measurement of the distance between the milling device and the transport device. It is possible that parts of the sensor device are arranged on both the transport device and on the milling device. This can be the case, for example, when separate components are used for the distance measurement, such as transponder elements, reflectors, marking elements, etc., which are arranged on the transport device and/or on the milling device. Preferably, however, the sensor device is arranged completely on the milling device and is designed such that it does not require any special additional devices on the part of the transport device for measuring the distance. Starting from the position of the milling device, then, the sensor device determines the current distance to the transport device, particularly in the horizontal plane, especially in or, depending on the position of the transport device, against the working direction of the milling device. This bears the advantage that the transport device does not need to have any special devices for the distance measurement and none of the transport devices that are used during the milling operation needs to be equipped with corresponding elements of the sensor device. Ideally, the sensor device is attached to the milling device in an area facing the transport device and uses, for example, sections of the transport surface as reflection surface for travel-time measurement and thus for distance measurement. The sensor device is thus attached to the milling device, that is, for example, to the engine frame, or to an element that moves together with the milling device during milling operation. For this purpose, what is important is that the measuring direction of the sensor device is oriented in the direction of the transport device in order to be able to measure the distance to the transport device as directly as possible and without redirection.

In principle, a variety of measurement methods can be used to determine the distance by means of the sensor device. The sensor device comprises at least one sensor for determining the distance, particularly in the horizontal direction, but can also include multiple sensors and sensors using different measurement methods. Optimally, all existing sensors determine the distance between milling device and transport device in the same direction, particularly in or against the work direction, especially in the horizontal plane. Measurement methods based on travel-time measurement or phase shifting have proven to be especially suitable for this purpose. In this case, a signal actively emitted by the sensor device is reflected by an object, in this case preferably by the transport device; it is then received back by the sensor device and converted directly into a distance value and finally sent to the control unit, or else it is converted into a concrete distance value only by the control unit. The sensor device can thus, for example, emit light waves, especially laser, infrared, radio, ultrasound, or radar waves, for measuring the distance. Thus, the sensor unit particularly preferably contains at least one ultrasound, radar, or laser sensor element. A sensor element is therefore generally a measurement element that is designed specifically for distance measurement, such as through the emission of a measurement signal and the reception of a reflection signal. Thus at least one sensor element and especially multiple sensor elements, preferably combined in one sensor housing, make up the sensor device.

To increase the accuracy of the distance measurement, it is advantageous to use at least two sensor elements to determine the distance between milling device and transport device. It is especially preferable to arrange the sensor elements at the same height next to each other on the engine frame of the milling device so that the contour of the transport device, which changes in the length from top to bottom, does not distort the actual distance value. Moreover, the at least two sensor elements should preferably be separated from each other as far as possible in the width in order to obtain especially exact distance values.

The area between the milling device and the transport device is especially critical during the milling operation and normally may not be entered by any person, since personal injuries can occur there easily. In a preferred embodiment of the present invention, therefore, the sensor device according to the present invention is used not only to monitor the distance between the milling device and the transport device but also simultaneously for area monitoring of this space. Area monitoring in this context means in particular that the presence and absence of persons in this area is monitored. In this embodiment, for example, the control unit can be designed in such a way that in the case of sudden distance changes, as is the case, e.g., when a person enters the monitored area, it signals this danger situation through the output device. At the same time or alternatively, the control unit can also be designed to recognize the transport device. For one thing, this enables the control unit to be able to distinguish between the transport device and other objects. For another, the control unit can take into account different characteristics of the respective transport devices for distance monitoring and output of the control commands, such as differing dimensions of the respective transport container, etc. This embodiment particularly preferably includes at least one sensor element that is designed to create a radio field for area monitoring. This radio sensor has inter alia the advantage of being, e.g., less sensitive to impact on functionality by dirt.

A further central element of the present invention, according to one embodiment, is the output device, which is designed either to directly display the measured distance value or, preferably, to give at least the control signals "stop," "drive forward" and "depart." The following remarks essentially refer to the preferred embodiment. It is basically possible, for example, for the output device to give these control signals, as has been usual up to now, through a horn, with the difference that the actuation of the horn occurs automatically through the control unit and not manually by the operator of the milling device. However, it is preferable if the output device gives the control signals in a way that is optically or visually perceivable. For this purpose, the output device can use, e.g., a suitable display element, comparable to a traffic light. The display can be arranged on the milling device in such a way that the driver of the transport device can watch the output device via the rear-view mirror of the transport vehicle. However, this requires the permanent attentiveness of the driver of the transport vehicle. A solution for this can be an output device that is placed on or in the transport vehicle. The observation of the output device is then significantly more comfortable for the driver of the transport vehicle.

For this purpose, according to one embodiment of the present invention, the design can be such that the control unit triggers an output device for output of the control commands to the driver of the transport vehicle that is already present in the transport vehicle, such as a navigation device, a radio system, a separate display, etc. However, this requires a compatibility of this output device with the control unit, which will not necessarily always be a given. The output device can also be permanently installed in or on the transport vehicle. For example, it is possible that a suitable display element is integrated into one or more of the mirrors on the transport vehicle. On the other hand, this requires a corresponding outfitting of the entire fleet of transport vehicles with appropriate output devices. Therefore, it is especially preferable that the output device be designed as a mobile part that can be attached to or in the transport vehicle during the loading process. The mobile part distinguishes itself through the fact that it is portable and can be exchanged among multiple transport vehicles without installation effort. Already available transport devices can thereby be economically provided with an output device that supports the operator with the coordination of the material removal during milling operation.

The method by which the output device issues the control commands to the driver of the transport vehicle can also vary. This can occur, for example, with acoustic signals and/or optically. In principle, a haptically perceptible signalling, such as with a vibration device, is also additionally or alternatively possible. In practical use, however, an optical display of the control commands has especially proven to be particularly suitable. Ideally, therefore, the output device is equipped with an optical display. This optical display can be, for example, a monitor, an indicator strip or even a traffic light. The optical display serves in any case for the visualization of the control commands that show the driver of the transport device how the distance to the milling device is to be regulated.

In a preferred embodiment of the present invention, the output device is designed for wireless communication with the control unit. This bears the advantage that the control unit need not be in the immediate vicinity of the output device, nor must there be a cable connection between the two units.

Through the arrangement of the output device on or in the transport device, the coordination of the distance between transport device and milling device during the milling operation is simplified for or taken over from the transport device driver, and thereby a collision between the milling device, which usually travels constantly in the working direction, and the transport device, which frequently travels in the work direction in starts and stops by intervals in front of or behind the milling device, is safely avoided. To give the operator of the milling device an opportunity to check the signals and the reactions of the transport device driver, it is advantageous to provide a control output device in addition to the output device that is designed to display the control commands to the driver of the transport device. This is likewise controlled by the control unit. The control output device is designed in such a way that the driver of the milling device can recognize and check which control commands are being given to the driver of the transport vehicle. The control output device is thus designed and arranged in such a way that the operator of the milling device can observe and check the control commands. The control output device is preferably attached on or near the control workstation of the milling device. The control workstation in this context means that area in which the operator of the milling device operates the milling device during the milling operation. The control output device can also issue the control commands optically, haptically and/or acoustically, while an optical display has proven to be particularly suitable. The control unit is thus designed in such a way that it activates the output device and the control output device simultaneously and triggers the display of the control commands. The control output device can in the simplest case use the same structural design, especially a design as a mobile part, or even be one piece together with the output device. In this way, the total number of different components can be kept low.

Preferably the control unit and the sensor device are designed as one piece or accommodated by a common housing, which significantly facilitates the mounting of the sensor device and the control unit on the work train. Alternatively, however, the control unit and the sensor device can also be attached in or on the transport device and the milling device separately from one another as individual elements. The transmission of data and control commands between the sensor device and the control unit on the one hand and the control unit and the output device on the other occurs through a suitable connection that enables a communication among the respective elements and in particular the reception and/or sending of data and/or control commands. A connection of this kind can be in particular a wire for transmission of electrical or optical signals and most especially also a wireless connection, such as a radio connection.

The milling device of the work train can be designed variously, especially with regard to the positioning and removal direction of a conveyor belt arranged on the milling device. For example, milling devices are known that have a conveyor belt discharging the milled material backward with respect to the work direction, or, in some cases, to the side of the milling device. However, the present invention has proven to be particularly suitable, aside from a loading against the work direction, for implementation with a so-called front-loader milling device, with which the transport direction for the milled material is arranged in the work direction of the milling device or toward the front and the removed material is thereby discharged forward in the work direction of the milling device into the transport container. The transport vehicle in this embodiment therefore travels in front of the following milling device and moves on the surface still to be milled. With this embodiment, the advantage of the collision prevention between the two vehicles in the work and loading operation becomes especially important.

Overall, therefore, the combination of sensor device, control unit and output device enables an automated distance monitoring, particularly in the horizontal plane, especially in or against the work direction, and distance regulation through the self-activating output of corresponding control commands, without requiring an individual intervention and constant checking of the distance by the operator of the milling device. Hence, the operator of the milling device no longer continually needs to observe the position of the transport device relative to the milling device and is thus significantly relieved in this respect. Conversely, the driver of the transport vehicle must only remain focused on the control commands given by the output device, which, depending on the embodiment, are synchronously given to the driver of the milling device through the control output device.

As mentioned above, the sensor device, the control unit and the output device are preferably arranged on the milling device in order to avoid, for example, a comprehensive outfitting of a fleet of transport devices. A further aspect of the present invention lies therefore also in a milling device with a sensor device for distance measurement of the milling device to the transport device, with a control unit and with an output device. These three elements are designed according to the above description for the work train according to the present invention. The milling machine or milling device can for this purpose be particularly a cold miller, most especially a street cold miller or a surface miner.

Furthermore, another aspect of the present invention lies in a system for integration in a work train for milling off of soil, e.g., a work train according to the above description, particularly for the milling off of roads and for the removal of the milled material. The system comprises a sensor device, a control unit and an output device, as they have been described in the preceding paragraphs. The system can also especially be designed as a retrofit kit with the components "sensor device," "control unit" and "output device," whereby in particular the sensor device and the control unit or the control unit and the output device and most especially the control unit, the sensor device and the output device can be designed as a one-piece unit. The components of the system can, for example, be designed for permanent mounting but especially also as mobile elements that are designed for quick installation and removal.

Finally, the present invention also relates to a method for determining and monitoring the distance, particularly in or against the work direction, and especially of the distance in the horizontal plane, between a milling device with a work roller and a transport device with a transport container into which milled-off soil can be transported from the milling device by means of a conveyor device. With regard to the specific design and functioning mode of the transport device and the milling device, reference is made to the previous remarks. The procedure according to one embodiment of the present invention is essentially characterised by the fact that, depending on the distance of the milling device to the transport vehicle, especially horizontally, an output device for the output of control commands is controlled by a control unit. The method according to one embodiment of the present invention comprises precisely determining and monitoring the distance between milling device and transport device by a sensor device during the milling and loading operation. The distance being constantly determined by the sensor device is then transmitted to the control unit. Depending on the determined distances, an output device is finally controlled by the control unit; the output of at least the control commands "stop," "continue" and "depart" being controlled by the control unit depending on the respective distance value measured by the sensor device. The control unit, the sensor device and the output device are especially designed according to the above description for the work train, for the milling device and for the system for integration into a work train according to various embodiments of the present invention.

One aspect of the method is thus the presence of a sensor device that is designed for determination and permanent monitoring of the distance, especially horizontal, between the milling device and the transport device during the milling operation. Through the automated distance monitoring, especially in or against the work direction of the milling device, the work is significantly simplified for the operator of the milling device because he no longer has to constantly monitor the position of the transport device relative to the milling device he is operating and give corresponding control commands to the transport device driver.

A first step of the method according to one embodiment of the present invention, therefore, is the determination of the distance between the milling device and the transport vehicle by the sensor device, especially starting from the milling device, preferably in or against the work direction of the milling device and especially in the horizontal plane. This determination is continued through the entire loading period, so that as a result the distance between the milling device and the transport vehicle is monitored. The distance values constantly determined by the sensor device are transmitted to the control unit. The control unit processes the determined distance values. Specifically, the processing of the distance values means, for example, that the control unit evaluates the distance values on the basis of predefined requirements, such as defined threshold values like minimum or maximum distances, and controls an output device depending on the evaluation. Thus, it is the task of the control unit to receive and evaluate the measured values received from the sensor device and then to control the output device depending on the current distance value. The task of the output device is communicating to the driver of the transport vehicle control commands for regulating the distance between the transport vehicle and the milling device via optical, acoustic and/or haptic signals and thus relieving the operator of the milling device accordingly. The output device must thus be arranged for the driver of the transport device at least in such a way that he can perceive the respective control commands, concretely, e.g., within the field of vision or within earshot. To relieve the operator, the control unit therefore transmits the distances measured by the sensor device or the signals resulting from the evaluation of the distances through the output device. The signals or results transmitted by the output device inform for the transport device driver as to when to drive forward or stop or where to steer the vehicle.

According to one embodiment of the method according to the present invention, the distance between the milling device and the transport device constantly lies within a defined distance range, particularly horizontally and especially in or against the work direction, during the loading process, even when both vehicles move forward in the milling and loading operation with differing speeds. In general, the control unit for this purpose is designed in such a way that, upon reaching a minimum distance between the two vehicles, it transmits a control command to increase the distance and, upon reaching a maximum distance, a control command to decrease the distance. In case of a milling device loading in the work direction or toward the front (front-loader milling device), the output device emits a "Forward" signal upon reaching a minimum distance between the milling device and the transport device travelling in front of it, so that the driver of the transport device drives forward and thus increases the distance between the two vehicles. Upon reaching a maximum distance between the milling device and the transport device travelling in front of it, the control unit triggers the emission of a "Stop" signal. The transport device thus stands still and the working milling device draws closer to the transport vehicle as the milling operation continues. The minimum distance in the preceding example is accordingly defined such that the milled material can just still be directly offloaded into the front area of the transport container and does just not yet fall out forward in the work direction or that still no collision between the two vehicles occurs, depending on which distance is greater. The maximum distance is the distance at which the milled material can still be dropped in the rear area of the transport container and does not fall to the ground behind the transport device.

An essential basic principle of the method according to one embodiment of the present invention thus lies in the idea that the driver of the transport vehicle receives his driving orders during the milling operation automatically from the output device controlled by the control unit depending on the currently measured distance value. Thus, it is no longer necessary that the operator of the milling device simultaneously monitors and controls the milling process, the loading process and the relative positioning between the milling device and the transport device. Instead, the distance monitoring and the output of corresponding control commands for the distance regulation occurs automatically, so that the operator of the milling device can fully concentrate on the milling work.

Furthermore, the method according to one embodiment of the present invention can also comprise warning functions. Minimum distance and/or maximum distance are then defined in such a way that a safety buffer is provided. Thus, upon reaching the minimum distance, a collision between the two vehicles does not occur immediately, but only after the distance falls below even the minimum distance by a certain amount. The minimum distance (and also additional or alternatively the maximum distance) is therefore the distance value that should not be fallen below (/exceeded) during operation. Should the distance value measured by the sensor device fall below the minimum value, the output of a warning message to the driver of the transport device and, depending on the embodiment, also to the operator of the milling device is possible to prevent collision or an incomplete transfer of the milled material into the transport container. The warning message distinguishes itself from the output of a regular control command in that it is significantly more noticeable, e.g., louder, flashing, etc.

For the operator of the milling device, it is advantageous to be able likewise to perceive the signals transmitted to the transport device driver, in order to be better prepared for the actions of the transport device driver, such as starting or stopping, and to be able to react appropriately quickly. For this purpose, the respective control signal is preferably emitted simultaneously by the output device and a control output device. In this way, for example, the output device can be arranged on the transport device and the control output device on the milling device, or both output devices either on the transport device or especially on the milling device. The control unit in this embodiment is thus designed in such a way that the forwarding of the control signals occurs simultaneously to more than one output device, particularly two output devices.

In a work train according to one embodiment of the present invention, the transport device and the milling device are moved independently of one another. Especially during work operation, the space between the transport device and the milling device is thus a risk area, in which accidents involving persons entering this area can occur easily. Often neither the operator of the milling device nor the driver of the transport vehicle can see this area. Moreover, during the milling operation, both vehicles move relative to one another, so that especially the width of this intermediate area is not constant, but rather variable. Furthermore, it is possible that if an object or person is in the space between the transport device and the milling device, the sensor device measures not the distance between the transport device and the milling device, but rather the distance to the object or person, which could occur at least with the use of very simple sensor devices. This can then incorrectly trigger an activation of the output device. Therefore, the sensor device and the control unit, aside from the strict distance monitoring function, preferably simultaneously provide for an area monitoring function that especially monitors the area between milling device and transport device for the presence of a person or monitors for the absence of persons in this area during the work operation. For this purpose, for example, the sensor device is designed such that it recognizes obstacles between the milling device and the transport device and can distinguish between a vehicle and a person. This can be achieved, for instance, in that the sensor device emits signals scanning the surroundings in a fan-like manner. The contour of the object can be deduced from the sequence of the received signals. This, for example, allows for detecting a person entering the area between the milling device and the transport device. Transponder elements or light barriers or especially also radio fields present another option for setting up an area monitoring between transport device and milling device. Also conceivable is a design of the sensor device and/or the control unit such that the control of the output device depends on whether the distance value measured in the milling operation changes slowly and continually or whether a sudden distance change occurs, as would be the case, e.g., when a person enters the intermediate area. In this case, it is possible that the control unit triggers a person and/or obstacle alarm that is given to the driver of the transport device and, depending on the embodiment, also to the operator of the milling device through the output device, which is designed to give a corresponding warning signal.

For the operator of the milling device, especially with a front-loader milling device, it is problematic to pay simultaneous attention during the milling operation forward to the path of the street and the path of the milling edge. The result can be that a cornering move initiated by the transport device driver is recognized by the operator of the milling device too late, since the latter predominantly concentrates on the execution of the milling work. The method according to one embodiment of the present invention therefore preferably provides for a corner recognition function, with the help of which a cornering move by the transport device driving in front of the milling device is detectable. A cornering move by the preceding transport device can, for example, occur through the coupling of at least two sensor elements separated from each other horizontally. The cornering move recognition can thus specifically arise from a difference between the distance values measured by the two sensor elements between the transport device and the milling device. In a cornering move, the two vehicles stand at an angle to one another in the horizontal plane.

BRIEF DESCRIPTION OF THE DRAWINGS

The present invention is explained in greater detail below on the basis of the embodiment examples presented in the drawings. Identical components are designated hereinafter with identical reference numerals. The schematics show:

FIGS. 1a and 1b are side views of an exemplary work train comprising a transport device and a milling device;

FIGS. 2a and 2b are side views of a work train with a sensor device;

FIGS. 3a to 3c are top views of a work train from FIGS. 1a, 1b, 2a and 2b;

DETAILED DESCRIPTION OF THE INVENTION

Figure 4:
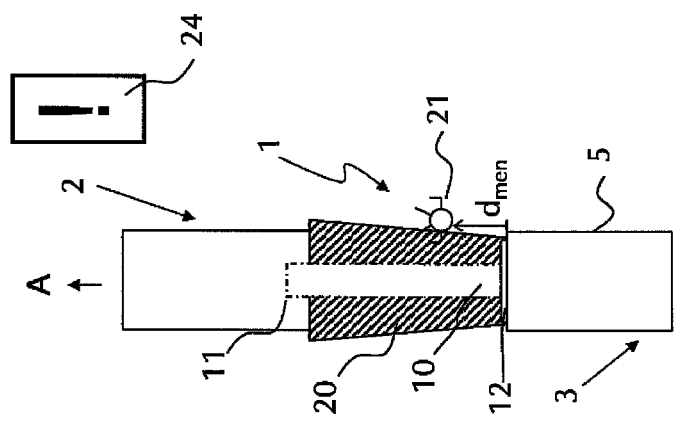
FIG. 4 is a top view of a work train for the illustration of the various distances.

FIGS. 1a and 1b show a work train 1, comprising a transport device, in this embodiment an articulated lorry with transport trailer 2, and a milling device, specifically a self-propelled cold miller 3. During the milling operation, the milling machine 3 removes the ground surface to be milled off 9 with the help of the milling rotor 8. The milling machine 3 comprises an engine frame 5, a chassis 6 (with four individual lift columns with caterpillar gondolas) and a control workstation 7. The milling rotor 8 is mounted in a milling drum housing and is driven transversely to the work direction A of the work train 1. The soil removed by the milling machine 3 is transported via a conveyor device, constructed as conveyor belt 10, into a transport container 4 of the articulated vehicle 2. The conveyor belt 10 is in the present embodiment example attached to the engine frame 5 of the milling machine 3 and is directed at an angle forward and vertically upward in the direction of the articulated vehicle 2 or in work direction A. The milling machine 3 is thus a so-called front-loader street milling machine and conveys the soil milled off in the work operation (milled material) in work direction A forward to the transport vehicle travelling in front of it. The milled material is dropped at the upper end 11 of the conveyor belt 10 into the transport container 4 of the articulated vehicle 2. Thus, the articulated vehicle 2 is loaded from above by means of the conveyor belt 10. The transport container 4 has in this case a front wall at the forward end 41, a back wall at the rear end 42 and corresponding side walls as well as a bottom and has an essentially box-shaped structure.

During the milling operation, the milling machine 3 travels in work direction A over the ground to be processed. The milled material is discharged via the transport belt 10 into the transport container 4. The articulated vehicle 2 normally cannot drive along at the relatively slow speed of the milling machine 3. Thus, a repeated driving forward and standing still of the articulated vehicle 2 during the loading operation has become standard practice. This process is further explained below for the example of the front-loader miller 3. The present invention can nonetheless also be used for millers that load toward the back or to the side; in this case, the control commands, especially with regard to the falling below and exceeding of a minimum and maximum distance still to be explained further, are designed for driving behind or driving alongside. It is optimal, however, if the transport vehicle drives in front of the milling machine 3 in the work direction during the work operation.

First, a maximum $d_{max}$ between the articulated vehicle 2 and the milling machine 3 is assumed. The distance d corresponds to the distance in work direction A between the engine frame 5 of the milling machine 3 and the back end 42 of the transport container 4 or of the articulated vehicle 2 in the horizontal direction. The maximum horizontal distance $d_{max}$ is defined such that the milled material can just still be dropped in the area at the back end 42 of the transport container 4 of the preceding transport vehicle, i.e. at the side facing the milling machine 3. As soon as the articulated vehicle 2 stands at the distance $d_{max}$ in work direction A in front of the milling machine 3, the loading process and the milling operation can begin. In this process, the milling machine 3 moves with nearly constant and comparatively slow speed toward the stopped articulated vehicle 2 in work direction A until a minimum horizontal distance $d_{min}$ between the articulated vehicle 2 and the milling machine 3 (FIG. 1b) is reached. The minimum distance $d_{min}$ corresponds by definition to that horizontal distance at which the milled material is not yet dropped beyond the transport container and still no collision occurs between the two vehicles, depending on which distance is greater. In the next step, the articulated vehicle 2 drives forward in work direction A and increases the distance d to the milling machine 3 until the maximum distance $d_{max}$ is reached and stops again. This process is repeated until the transport container 4 is loaded with milled material to a predetermined fill height and the articulated vehicle is replaced by another articulated vehicle with an empty transport container.

This process, which constantly changes the distance between the articulated vehicle 2 and the milling machine 3 between $d_{max}$ and $d_{min}$, enables the milling machine 3 to load milled-off soil evenly into the transport container 4 from the back end 42 to the front end 41. Furthermore, a collision between the articulated vehicle 2 and the milling machine 3 is avoided by the increase of the distance between the two vehicles from $d_{min}$ to $d_{max}$.

Previously, the operator of the milling machine 3 had to give the driver of the articulated vehicle 2 active driving commands to start, stop and depart, e.g., with a horn signal. For example, the operator of the milling machine 3 triggered the horn upon reaching the minimum distance $d_{min}$, whereby he signalled the driver of the articulated vehicle 2 to move forward in work direction A. Upon reaching the maximum distance $d_{max}$, the operator of the milling machine 3 triggered the horn again and signalled the driver of the articulated vehicle 2 to halt. After repeated starting and stopping, the milling machine operator finally signalled again by triggering the horn that the transport container 4 of the articulated vehicle 2 was filled with milled material and that a depart was needed. The operator of the milling machine 3 therefore needed to carry out multiple processes simultaneously. He had to observe and control the milling process and at the same time transmit control commands depending on the distance between the vehicles to the driver of the articulated vehicle 2. To relieve the operator of the milling machine 3, a sensor device 12 is now provided according to the present invention, which takes over the evaluation of the distance from the milling machine operator and in a preferred embodiment simultaneously triggers and transmits control commands to the driver of the transport device 2.

Essentially, the sensor device must be designed in such a way that it can measure and monitor the distance, ideally horizontal, between the milling device 3 and the transport vehicle 2. According to the embodiment examples in FIGS. 2a and 2b, the sensor device 12 is attached for this purpose to the milling machine 3 in the direction to the transport vehicle 2, specifically on the front side of the milling machine 3 that faces the transport vehicle 2 in work direction A. For this purpose, the sensor device 12 can be attached directly to a part of the milling machine 3 or else to another element that can then be attached to the milling machine 3. FIG. 2a shows the sensor device 12 on conveyor belt 10 of the milling machine 3 with viewing or measuring direction oriented toward the preceding transport vehicle 2. In this embodiment, the sensor device 12 measures the horizontal distance d between the lower end of the transport container 4 of the articulated vehicle 2 and the conveyor belt 10 of the milling machine 3. FIG. 2b shows another possible arrangement of the sensor device 12 on the lower part of the engine frame 5 of the milling machine 3. Whereas the sensor device 12 arranged on the conveyor belt 10 from FIG. 2a can be swivelled together with the conveyor belt 10, the sensor device 12 according to FIG. 2b is arranged rigidly on the engine frame 5 of the milling machine 3.

The sensor device 12 shown in FIG. 2b is for this embodiment a four-channel ultrasound sensor device; that is, four sensor elements are placed next to each other at the same height at the front on the engine frame. For distance measurement between the milling machine 3 and the articulated vehicle 2, these sensor elements continually send ultrasound signals in the horizontal direction toward the articulated vehicle 2. Upon reflection at the articulated vehicle 2, the sensor elements receive the ultrasound signals and transmit these to a control unit 13 integrated into the sensor device 12, which calculates the distance between the milling machine 3 and the articulated vehicle 2 from the travel time of the ultrasound signals. In this embodiment example, the control unit 13 is integrated into the sensor device 12. However, the control unit 13 can also be attached spatially separately from the sensor device 12 either on the milling machine 3 or on the transport device 2 and can, for example, communicate wirelessly with the sensor device 12.

The control unit 13 is also connected to an output device which either communicates the calculated distance value directly or a signal, e.g., a control order, which the control unit 13 gives depending on a distance value. FIG. 2a shows an output device in the form of an optical display, in this example a traffic light 15', which is attached in the cab of the transport device 2. The traffic light 15' is a portable unit that can be installed in every vehicle, e.g., on the interior mirror with a hook. With this embodiment, the operator of the articulated vehicle 2 is able to have the traffic light 15', which displays control orders, in sight at all times and to control the articulated vehicle 2 according to the control orders. FIG. 2b shows another variant of the optical display device, in which the traffic light 15" is attached to the milling machine 3, so that the operator of the articulated vehicle 2, through the mirrors attached to his vehicle, is able to observe the traffic light and to control his vehicle according to the signals shown.

To give the operator of the milling machine 3, who usually cannot fully see the traffic light 15', 15" either, the opportunity to receive the signals shown on the traffic light 15', 15" himself, the milling machine 3 is equipped with an optical control display, the control traffic light 16', 16". The control traffic light 16' can, as shown in FIG. 2a, be placed on the milling machine 3 in an area near the manoeuvring stand that is visible to the milling machine operator or even in the manoeuvring stand itself. The control traffic light 16' is thus designed as a structurally separate unit. By contrast, in FIG. 2b the control traffic light 16" is integrated into the traffic light 15", so that with one output device, both the driver of the transport vehicle 2 and the operator of the milling machine 3 receive information about the current control orders.

FIGS. 3a through 3c illustrate the dependency of the optical signals displayed by the traffic light 15' or 15" (and the signals displayed on the control traffic light 16', 16") on each distance measured by the sensor device 12 between the milling machine 3 and the transport vehicle 2. The control unit 13, designed in FIGS. 3a to 3c as a separate unit, thus has not only the task of processing the signals (distance values) received by the sensor device 12 (or to determine specific distance values from the measured values), but also to regulate the optical display device (traffic light 15', 15" and potentially control traffic light 16', 16") depending on these distance values. In FIGS. 3a to 3c, the work train 1 with the articulated vehicle 2 and the milling machine 3 can be seen from the top view. The distance between articulated vehicle 2 and milling machine 3 is determined and constantly monitored by two sensor elements 12a and 12b of the sensor unit 12 and the control unit 13 integrated in a control panel 44 (shown dashed). The two sensor elements 12a and 12b are at the same vertical height and in the width of the milling machine 3 are placed at the two outer edges of the milling machine 3 and separated from one another. The control unit 13 triggers the optical display device 15', 15" and, depending on the embodiment, the control traffic light 16', 16" depending on the measured distance d or upon reaching the limit distances $d_{min}$, $d_{max}$, $d_{coll}$ to give the signals 17, 18, 19, to be explained in more detail below.

If the measured distance reaches the minimum distance $d_{min}$ (or if it falls below the minimum distance $d_{min}$), a "Forward" signal 17 is shown on the traffic light 15', 15" and, if applicable, on the control traffic light 16', 16". This sign signals the operator of the articulated vehicle 2, to drive forward in work direction A in order to increase the distance d between the two vehicles again. The driver of the transport vehicle 2 drives forward accordingly, so that the distance d to the milling machine 3, which moves significantly more slowly, increases. As soon as the sensor device 12 determines that the maximum distance $d_{max}$ between articulated vehicle 2 and milling machine 3 has been reached, the control unit 13 triggers a switching of the traffic light 15', 15" and, if applicable, the control traffic light 16', 16" to the "Stop" signal 18. The driver of the articulated vehicle 2 is thereby advised to stop. As the milling work continues, the milling machine 3 draws closer to the transport vehicle 2 again and the distance d between both vehicles shrinks again, until $d_{min}$ is reached and the driver of the transport device 2 is again instructed to drive forward.

The present embodiment also includes a collision warning function for the case that the two vehicles draw still closer to one another than $d_{min}$. If, starting from $d_{min}$, the distance between the articulated vehicle 2 and the milling machine 3 drops to the distance $d_{coll}$, a warning signal 19 is shown on the traffic light 15', 15" and, if applicable, on the control traffic light 16', 16". The warning signal 19 alerts the articulated vehicle driver and the milling machine operator to a danger situation and a potential imminent collision with an obstacle or between the two vehicles. The warning signal 19 can, for example, be significantly louder or made more clearly recognizable with a flash sign in order to reliably alert the two operators to the imminent collision. Alternatively, additional functions can potentially be linked to the distance falling below the distance $d_{coll}$ that serve to prevent a collision. This can be an auto-stop function, for example, which triggers the immediate halting of the milling machine 3.

In FIG. 4, the various distances d which the articulated vehicle 2 can have with respect to the milling machine 3 and are linked to the switching functions of the output device 15', 15", are shown next to each other. The three distances $d_{max}$, $d_{min}$ and $d_{coll}$ thus represent threshold values; upon reaching (and/or exceeding/falling below) these values, a switching of the signals 17, 18, 19 given in the output device 15,15" occurs. FIG. 4 especially clarifies that a safety reserve exists between the two signals $d_{min}$ and $d_{coll}$ and that a collision between the two vehicles 2 and 3 does not occur immediately upon reaching the minimum distance $d_{min}$.

Figure 5:
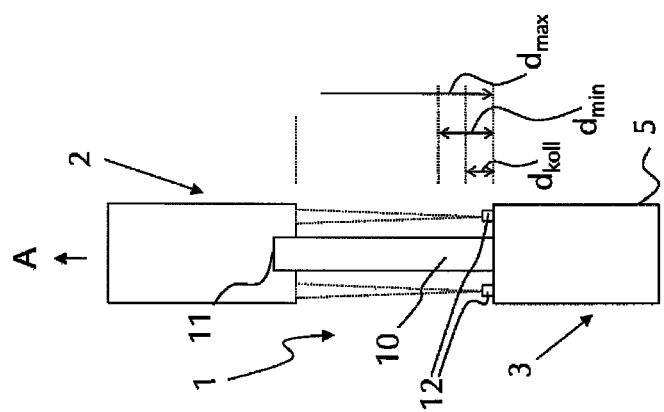
FIG. 5 is a top view of a work train for the illustration of the area monitoring.

During a milling operation, the situation can arise that people enter the area between the articulated vehicle 2 and the milling machine 3, which should normally be avoided for safety reasons. The embodiment in FIG. 5 deals with this safety risk in the way that the sensor device 12 is also configured for area monitoring that enables recognition of persons in the space between the milling device 3 and the transport vehicle 2. The sensor device 12 according to FIG. 5, which includes a radio sensor, measures and thereby monitors not only the distance between the articulated vehicle 2 and the milling machine 3, but also simultaneously checks and monitors whether objects and especially persons are in the space 20 between the milling device 3 and the transport device 2. FIG. 5 shows the monitoring area 20 between the articulated vehicle 2 and the milling machine 3. The sensor device 12, together with the control unit 13 (not shown), is designed in such a way that it can recognize objects in the monitoring area 20 that do not belong to the milling device 3 or to the transport vehicle 2. For example, if a person 21 moves into the monitoring area 20 during the milling operation, the signals reflected by the person 21 are suddenly received by the sensor device 12 faster than the signals reflected by the articulated vehicle 2. The control unit 13 (not shown) determines through the processing of the received signals that the measured distance $d_{per}$ is not the distance between articulated vehicle 2 and milling machine 3, but rather must be assigned to the person 21. The assigning of the signals received by the sensor device 12 can occur in various ways known from the prior art. For example, conclusions can be drawn about the contour or the size of the object from which the signal was reflected. However, the area monitoring can also occur by means of light barriers, wherein at least one light barrier is attached to the milling machine 3 for this purpose in addition to the sensor device. Basically, therefore, to maintain the area monitoring function, recourse can be made to any system designed to recognize persons in the monitored area. Upon detection of an object in the monitoring area 20, the control unit 13 triggers the display of the warning signal 24 on the traffic light 15', 15" and, if applicable, on the control traffic light 16', 16", which alerts the operators to the special danger situation.

Figure 6:
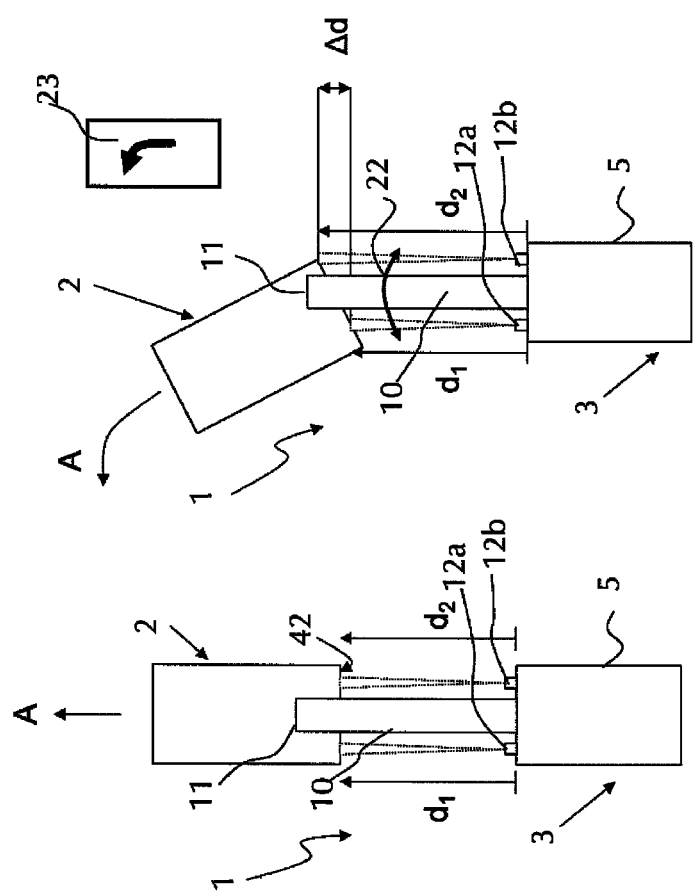
FIGS. 6a and 6b are top views of a work train for the illustration of a cornering move.

FIGS. 6a and 6b show the process of a cornering move of the work train 1 and illustrate the design of the overall system, made up of sensor device 12, control unit 13 and output device 15 for independent recognition of the cornering move. In this case, for reasons of clarity, the control unit 13 and the output device 15 are not shown. Reference is made to the preceding figures for their design and position. FIG. 6a shows the state of the work train 1 before a cornering move or when driving straight ahead. Thus, the articulated vehicle 2 in FIG. 6a drives straight ahead in work direction A of the milling machine 3. In this case, the distances $d_1$ and $d_2$, which are measured by the two sensor elements 12a and 12b placed on the front side of the milling machine 3 to the right and to the left, between the back end 42 of the transport container 4 of the articulated vehicle 2 and the front part of the engine frame 5 of the milling machine 3 are the same size and also remain the same size at different distances. Now, if a cornering move is initiated by the operator of the articulated vehicle 2, as shown in FIG. 6b, the operator of the milling machine 3 must react in due time to be able to ensure the complete milled material transport into the transport container 4 even during the cornering move. This can be accomplished, for example, by swivelling the conveyor device 10 to the side, as indicated in FIG. 6b by the arrow 22. In order to prepare the operator of the milling machine 3 early for an upcoming cornering move in work direction A, the optical display device emits a signal 23 through the control traffic light 16', 16" that indicates the upcoming cornering move. Obviously, this signal can also be shown through the output device 15',15" for the driver of the transport device 2. For this purpose, the actual recognition of the cornering move occurs through a distance comparison between $d_1$ and $d_2$. If at least one of the two vehicles 2 and 3 of the work train 1 is in a cornering move, both vehicles assume an angled position in the horizontal plane relative to one another with respect to the work direction A. The distance values $d_1$ and $d_2$ determined by the sensor elements 12a and 12b and the control unit differ in this case by the amount $\Delta d$. A boundary value is also set for $\Delta d$; when this value is exceeded, the control unit triggers the additional display of the signal 23. Through this, the operator of the milling machine 3 is prepared for the cornering move early and can react accordingly in due time.

Moreover, the control unit 13 calculates an adjusted true distance value on the basis of the varying signals of sensor elements 12a and 12b or distances $d_1$ and $d_2$ and the resulting difference $\Delta d$, upon which the triggering of the signals 17, 18, 19 shown in FIGS. 3a to 3c depends. The fact that the control unit 13 takes the difference $\Delta d$ of the distances $d_1$ and $d_2$ into account in the processing of the signals received from the sensor elements 12a and 12b ensures that a signal, e.g., the signal 17 for reaching the minimum distance $d_{min}$, is not triggered on the basis of the cornering move. In a cornering move, one side of the back end 42 of the transport container 4 inevitably moves closer to the front part of the engine frame 5 of the milling machine 3.

Figure 7:
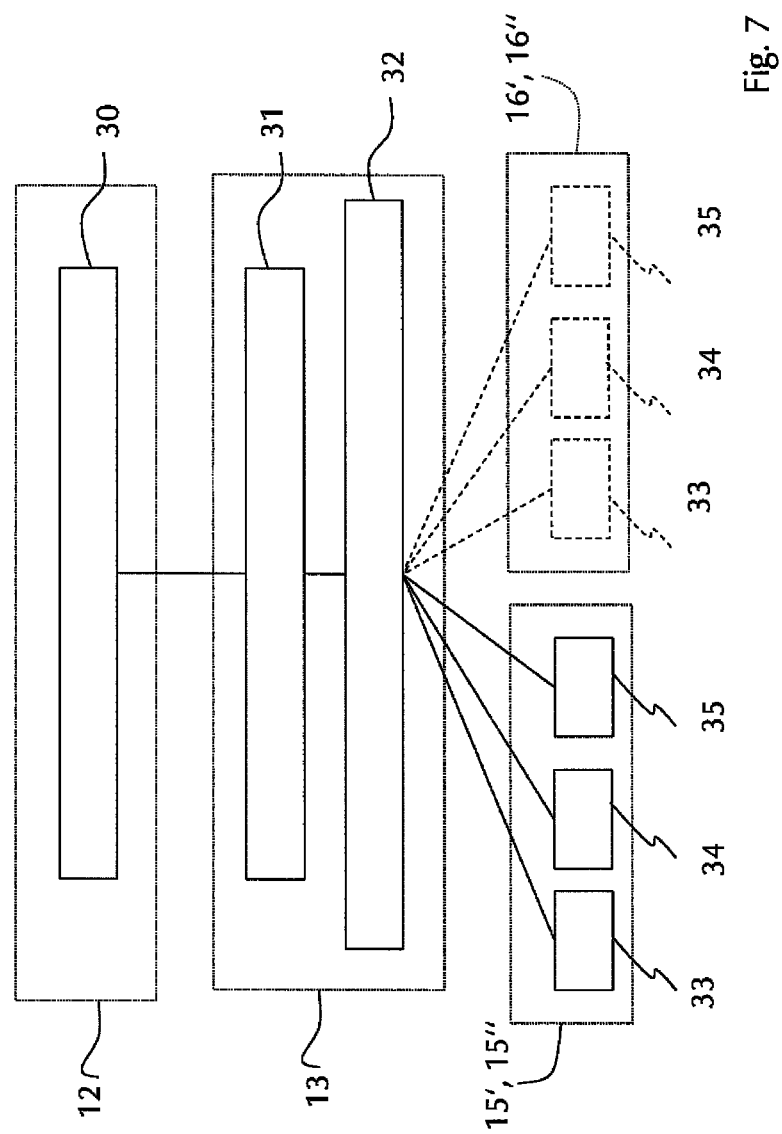
FIG. 7 is a flow chart for distance monitoring.

Finally, FIG. 7 illustrates the essential steps for implementing the method for determination and monitoring of the distance between the articulated vehicle 2 and the milling machine 3 and the control of the output device 15',15" depending on the measured distance values, according to one embodiment of the present invention. The determination of the distance between the articulated vehicle 2 and the milling machine 3 by means of the sensor device 12 occurs first in Step 30. This determination occurs continually, so that virtually the current distance is always monitored. The distances measured by the sensor device 12 are constantly processed in the control unit 13, which is represented by Step 31. Processing in this case means that the control unit determines precise distance values from the measured values and/or checks whether the measured distance values and/or measurement signals exceed or fall below certain fixed limit values $d_{max}$, $d_{min}$ and $d_{coll}$. In a further Step 32, the control unit 13 controls the traffic light 15', 15" and, if applicable, the control traffic light 16', 16" (shown dashed) depending on the measured distances or depending on whether certain threshold values have been exceeded or fallen below. If a minimum distance d between the articulated vehicle 2 and the milling machine 3 is reached, the traffic light 15', 15" and, if applicable, the control traffic light 16', 16" display a "Forward" signal (Step 33). Upon reaching a maximum distance, a "Stop" signal is given by the traffic light 15', 15" and, if applicable, the control traffic light 16', 16" (Step 34). Should a collision between the two vehicles be imminent the traffic light 15', 15" and, if applicable, the control traffic light 16', 16" are triggered by the control unit 13 to show a warning signal (Step 35).

While the present invention has been illustrated by description of various embodiments and while those embodiments have been described in considerable detail, it is not the intention of Applicant to restrict or in any way limit the scope of the appended claims to such details. Additional advantages and modifications will readily appear to those skilled in the art. The invention in its broader aspects is therefore not limited to the specific details and illustrative examples shown and described.

What is claimed is:

1. A work train comprising:
   a milling device having an engine frame, a milling rotor for milling off of the ground surface and a conveyor device for removal of the milled material; and
   a transport device moving independently of the milling device with a transport container into which the milled material from the milling device can be transported by the conveyor device;
   wherein:
   a sensor device is provided that is configured for measuring at least one distance (d) between the milling device and the transport device while the milling device and the transport device are separated from each other;
   a control unit is provided that processes the at least one distance (d) measured by the sensor device;
   a signal output device is provided that is controlled by the control unit in response to the at least one distance (d) exceeding a predetermined maximum distance value or falling below a predetermined minimum distance value so as to maintain a safety buffer between the milling device and the transport device while the milled material is transported by the conveyor device of the milling device to the transport device, and
   a monitoring device is provided that is configured to monitor an area between the milling device and the transport device.

2. The work train according to claim 1, wherein the sensor device is attached to the milling device in an area directed toward the transport device.

3. The work train according claim 1, wherein the sensor device has at least one ultrasound, radar or laser sensor element.

4. The work train according to claim 1, wherein the sensor device comprises at least two sensor elements placed next to each other at the same height on the engine frame of the milling device.

5. The work train according to claim 1, wherein the output device is arranged on or in the transport device.

6. The work train according to claim 1, wherein the output device is a mobile part.

7. The work train according to claim 1, wherein the output device includes an optical display.

8. The work train according to claim 1, wherein the output device is configured for wireless communication with the control unit.

9. The work train according to claim 1, wherein the work train comprises a control output device that is controlled by the control unit simultaneously with the output device.

10. A milling device, comprising:
    an engine frame;
    a milling rotor for milling off of the ground surface;
    a conveyor device for removal of the milled material and configured for transfer of the milled material from the milling device into a transport container of a transport device moving independently of the milling device;
    a sensor device configured for measuring a distance (d) between the milling device and the transport device so as to maintain a safety buffer between the milling device and transport device while the milled material is transported by the conveyor device of the milling device to the transport device; and
    a monitoring device that is configured to monitor an area between the milling device and the transport device.

11. A method for measuring the distance (d) between a milling device and a transport device that are part of a work train according to claim 1, comprising the steps:
- measuring the distance (d) between the milling device and the transport device using the sensor device;
- transmitting the measured distance (d) to a control unit; and
- controlling the output device in response to the measured distances (d).

12. The method according to claim 11, wherein upon reaching a minimum distance ($d_{min}$) between the milling device and the transport device, the output device displays a "Forward" signal and, upon reaching a maximum distance ($d_{max}$) between the milling device and the transport device, displays a "Stop" signal.

13. A method according to claim 12, wherein the display of a signal occurs simultaneously through the output device and a control output device.

14. The method according to claim 11, wherein upon falling below a limit distance ($d_{coll}$) between the milling device and the transport device, the output device emits a warning signal.

15. The method according to claim 11, wherein a monitoring of an area between the milling device and the transport device occurs in addition to measuring of the distance (d) in order to recognize obstacles between the milling device and the transport device.

16. The method according to claim 11, wherein a monitoring for a cornering move by the transport device occurs via the sensor device.

* * * * *